United States Patent [19]
Lita et al.

[11] Patent Number: 6,119,161
[45] Date of Patent: Sep. 12, 2000

[54] MANAGING CONNECTION REQUESTS IN A DIALUP COMPUTER NETWORK

[75] Inventors: Christian Lita, Austin; Joseph Raymond Thompson, Round Rock, both of Tex.

[73] Assignee: International Business Machines Corporation, Armonk, N.Y.

[21] Appl. No.: 08/808,264

[22] Filed: Feb. 28, 1997

[51] Int. Cl.⁷ .................................................. G06F 13/00
[52] U.S. Cl. ............................................ 709/227; 705/79
[58] Field of Search ................. 395/187.01, 200.79, 395/761, 200.57, 200.09, 200.48; 370/85.13; 380/49, 24; 379/266; 709/130, 131, 227; 707/9; 711/213

[56] References Cited

U.S. PATENT DOCUMENTS

| | | | |
|---|---|---|---|
| 5,583,862 | 12/1996 | Callon | 370/379 |
| 5,706,507 | 1/1998 | Schloss | 395/615 |
| 5,729,689 | 3/1998 | Allard et al. | 709/228 |
| 5,734,831 | 3/1998 | Sanders | 395/200.53 |
| 5,734,835 | 3/1998 | Selker | 395/200.79 |
| 5,737,619 | 4/1998 | Judson | 395/761 |
| 5,793,861 | 8/1998 | Haigh | 379/266 |
| 5,802,209 | 9/1998 | Logan et al. | 395/200.48 |
| 5,802,518 | 9/1998 | Karaev et al. | 707/9 |
| 5,809,250 | 9/1998 | Kisor | 709/130 |
| 5,812,668 | 9/1998 | Weber | 380/24 |
| 5,812,779 | 9/1998 | Ciscon et al. | 709/223 |
| 5,819,271 | 10/1998 | Mahoney et al. | 707/9 |
| 5,822,787 | 10/1998 | Zucker | 711/213 |
| 5,838,916 | 11/1998 | Domenikos et al. | 709/219 |
| 5,864,871 | 1/1999 | Kitain et al. | 707/104 |

OTHER PUBLICATIONS

Netscape Unleashed, Dick Oliver et al, Ch–27, 1996.

*Primary Examiner*—Zarni Maung
*Assistant Examiner*—Thong Nu
*Attorney, Agent, or Firm*—Jeffrey S. LaBaw; David H. Judson

[57] ABSTRACT

A method of managing connection requests from an application supported on a client. The client has a modem connectable to at least one server via a dialup computer network. According to the method, a list is maintained of the local Internet Protocol (IP) addresses assigned as modem connections are established to the dialup computer network during a session. The list is preferably in Last In, First Out (LIFO) order and includes a latest IP address as the last entry and one or more stale IP addresses. In response to a connection request associated with a stale IP address, the stale IP address is mapped to the latest IP address. The connection request is then redirected using the latest IP address. Preferably, client supports a proxy server which services the connection request locally if possible to avoid network traffic.

22 Claims, 5 Drawing Sheets

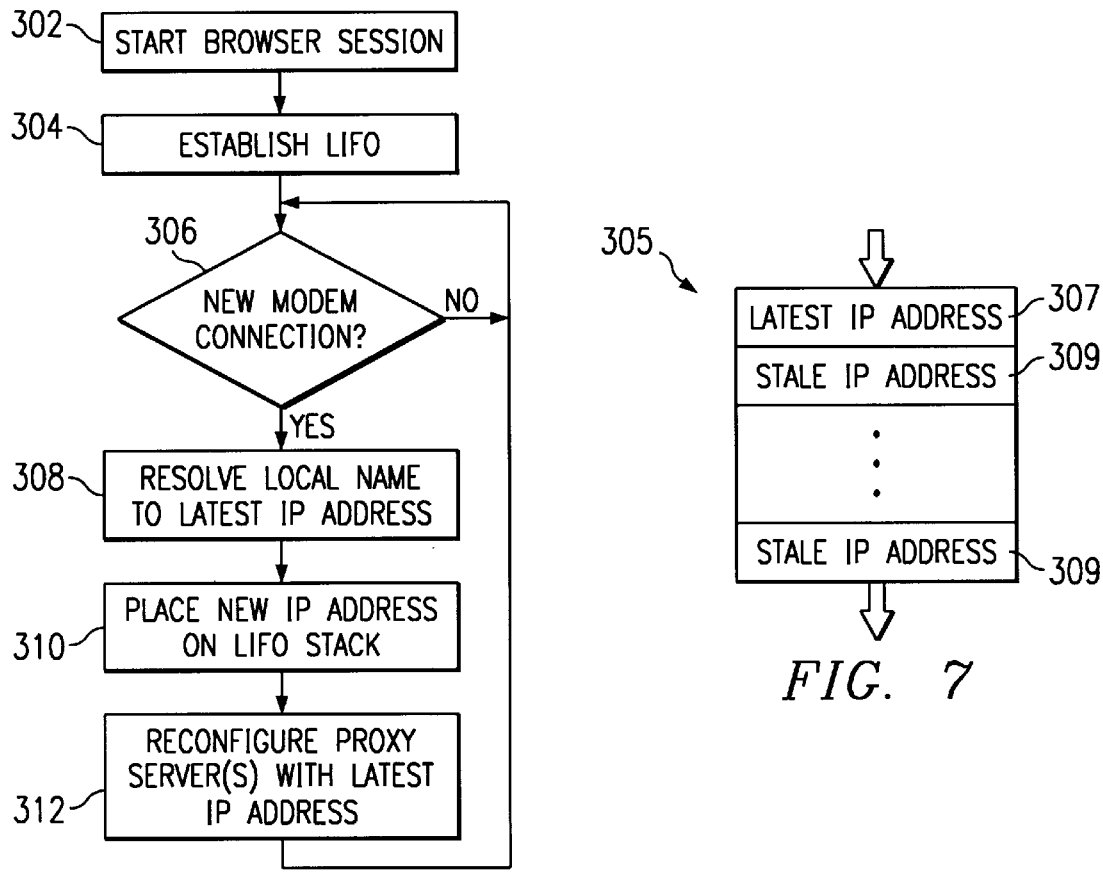
FIG. 6
FIG. 7
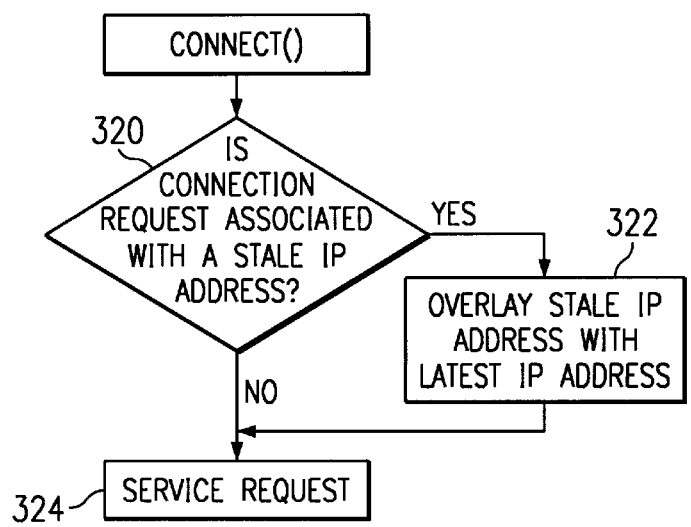
FIG. 8

MANAGING CONNECTION REQUESTS IN A DIALUP COMPUTER NETWORK

TECHNICAL FIELD

The present invention relates generally to computer network communications and more particularly to managing connection requests in a dialup computer network environment.

BACKGROUND OF THE INVENTION

There has been great interest in providing Internet access at minimal economic cost. While most computers now are pre-configured for Internet access, a significant percentage of households still do not have a personal computer. Thus, it has now been proposed to provide a data processing system that, much like a VCR, may be connected to a television set and used in lieu of a personal computer to provide Web access through a conventional remote control device associated with the to system unit. Such a system enables the television to become, in effect, a "Web" appliance. The viewer can rapidly switch between conventional television and Internet access using the remote control unit.

All of the conventional "Internet" access tools and navigational functions are preferably "built-in" to the system and thus hidden to the user. One such tool is a browser, which is used to provide the user access to the Internet's multimedia information retrieval system, commonly referred to as the World Wide Web. Access to the Web is provided using the Hypertext Transfer Protocol (HTTP). Typically, a browser issues HTTP GET requests to servers in the World Wide Web by passing packets over the network and receiving Web documents.

The Web appliance will likely be connected to the Internet via a dialup computer network. The network and, in particular, the Internet service provider (or ISP), may assign an Internet Protocol (IP) address each time the Internet client dials up to the network. This IP address is used by a sockets mechanism to enable the browser to communicate with the network or, alternatively, to a proxy server supported in the client. Client side proxy server support has many advantages, as described in copending application Ser. No. 08/808,287 filed concurrently herewith. During a particular session, however, the connection to the dialup network may be broken, e.g., because the client is inactive for a period of time or the physical connection is disrupted for some reason. In the dialup environment, the IP address assigned by the ISP may change every time a new modem connection is established. When this IP address changes, the browser has to reconfigure itself if the connection to the local proxy server is to be properly maintained. If the browser cannot be configured, then it must be restarted in order to pass connection requests to the proxy server. Restarting a Web appliance, however, is very undesirable.

Thus, there is a need to enhance an existing sockets mechanism so that bind requests to stale IP addresses are redirected to a current IP address as modem connections are continuously broken and reestablished during a session.

BRIEF SUMMARY OF THE INVENTION

It is thus a primary goal of the present invention to manage service requests in a dialup computer network.

It is a more particular object of the invention to redirect connection requests associated with stale IP addresses in a dialup network so that communications between a browser and a local proxy server are maintained.

It is a more specific object of the invention to enhance a sockets implementation so that "binds" to a stale IP address are redirected to a current IP address transparent to the calling application.

It is still another object of the invention to provide a Web appliance with enhanced sockets capability through use of an IP address redirecting mechanism.

Still another more general object is to implement a client side proxy server on a client by binding a browser to the proxy server via a local IP address that may change upon modem reconnection.

Yet another more general object of the invention is to run an HTTP proxy on a client machine transparently to a browser even if the local IP address of the HTTP proxy changes as modem connections are reestablished to a dialup network during a browsing session.

It is still another object of the invention to manage connection requests to and from a client side proxy server where the client protocol stack does not support a loopback address for the proxy server.

These and other objects of the invention are provided in a method of managing connection requests from an application supported on a client. The client has a modem connectable to at least one server via a dialup computer network. According to the method, a list is maintained of the local Internet Protocol (IP) addresses assigned as modem connections are established to the dialup computer network during a session. The list is preferably in Last in, First Out (LIFO) order and includes a latest IP address as the last entry and one or more stale IP addresses. In response to a connection request associated with a stale IP address, the stale IP address is mapped to the latest IP address. The connection request is then redirected using the latest IP address. Preferably, the client supports a proxy server which services the connection request locally if possible to avoid network traffic.

In accordance with the invention, a client computer, for example, a Web appliance, is connectable to the Internet via a dialup computer network and comprises a modem, a processor having an operating system, a browser application run by the operating system, and a proxy server. A sockets routine run by the operating system manages HTTP and other Internet protocol connection requests from the browser application and other Internet mechanisms. This routine is enhanced to include program code means for maintaining a list of local Internet Protocol (IP) addresses assigned as modem connections are established to the dialup computer network during a session. The list includes a latest IP address and perhaps one or more stale IP addresses. The routine also includes program code means responsive to a connection request associated with a stale IP address for mapping the stale IP address to a latest IP address, and program code means for redirecting the connection request using the latest IP address. Thus, a conventional sockets implementation is enhanced according to the invention so that binds to a stale IP address are redirected to a current or most recent IP address.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 is a flowchart of the preferred method according to the present invention for generating a Last In, First Out (LIFO) stack in which IP addresses are maintained;

FIG. 7 is a representative Last In, First Out (LIFO) stack generated according to the routine of FIG. 6; and FIG. 8 is a connecto routine that is used to manage connection requests according to the invention.

DETAILED DESCRIPTION

Figure 1:
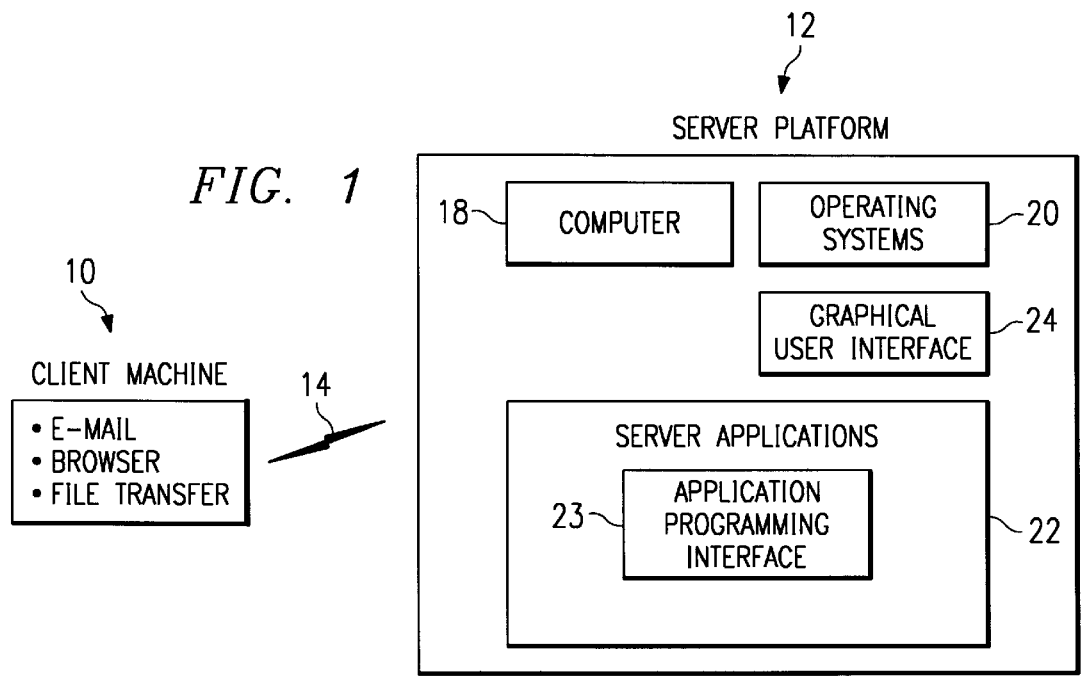
FIG. 1 is a representative system in which the present invention is implemented.

A representative system in which the present invention is implemented is illustrated in FIG. 1. An Internet client machine 10 is connected to a server platform 12 via a communication channel 14. For illustrative purposes, channel 14 is the Internet, an Intranet or other known connection. In the case of the Internet, server platform 12 is one of a plurality of servers which are accessible by clients, one of which is illustrated by machine 10, via a dialup computer network. The dialup computer network (or, more specifically, the Internet service provider or ISP) assigns an Internet Protocol (IP) each time the client dials up to the network. The client machine typically includes a suite of known Internet tools 16 to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system. File transfers are effected using the File Transfer Protocol (FTP); electronic mail service is provided by the Simple Mail Transport Protocol (SMTP) and so on.

By way of example only, a client machine is a personal computer such as a desktop of notebook computer, e.g., an IBM® or IBM-compatible machine running under the OS/2® operating system, an IBM ThinkPad® machine, or some other Intel x86 or Pentium®-based computer running Windows 3.1 or greater operating system. A representative server platform 12 comprises an IBM RISC System/6000 computer 18 (a reduced instruction set of so-called RISC-based workstation) running the AIX (Advanced Interactive Executive Version 4.1 and above) Operating System 20 and a server program 22. The platform 12 also includes a graphical user interface (GUI) 24 for management and administration. It may also include an application programming interface (API). Connection requests (such as HTTP GET requests for Web documents) are transferred from the client machine to the server platform in a known manner to obtain hypertext documents or objects. The various models of the RISC-based computers are described in many publications of the IBM Corporation, for example, RISC System/6000, 7013 and 7016 POWERstation and POWERserver Hardware Technical Reference, Order No. SA23-2644-00. AIX OS is described in *AIX Operating System Technical Reference*, published by IBM Corporation, First Edition (November 1985), and other publications. While the above platform is useful, any other suitable hardware/operating system/server combinations may be used.

Figure 2A:
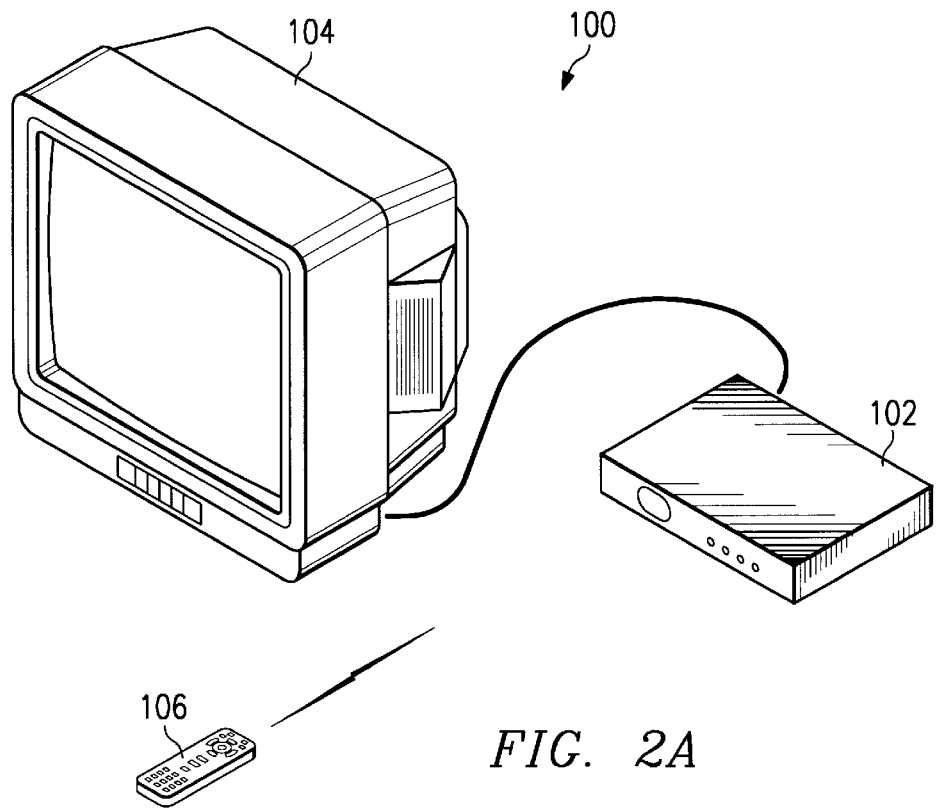
FIG. 2A is pictorial representation of a data processing system unit connected to a conventional television set to form a "Web" appliance.

Alternatively, the Internet client may be a data processing system or a so-called "Web appliance" such as illustrated in FIGS. 2A–2D and 3. FIG. 2A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet and to use other Internet Services such as e-mail and file transfer. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items.

Figure 2B:
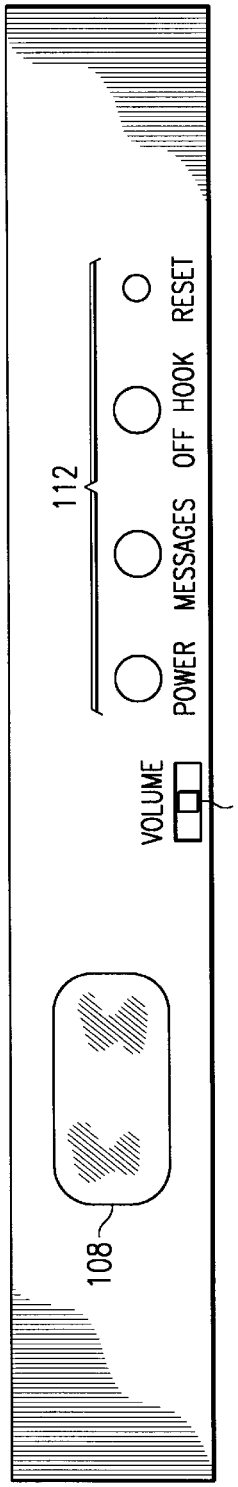
FIG. 2B is a pictorial representation of a front panel of the data processing system unit.

FIG. 2B is a pictorial representation of the front panel of data processing unit 102. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 2C:
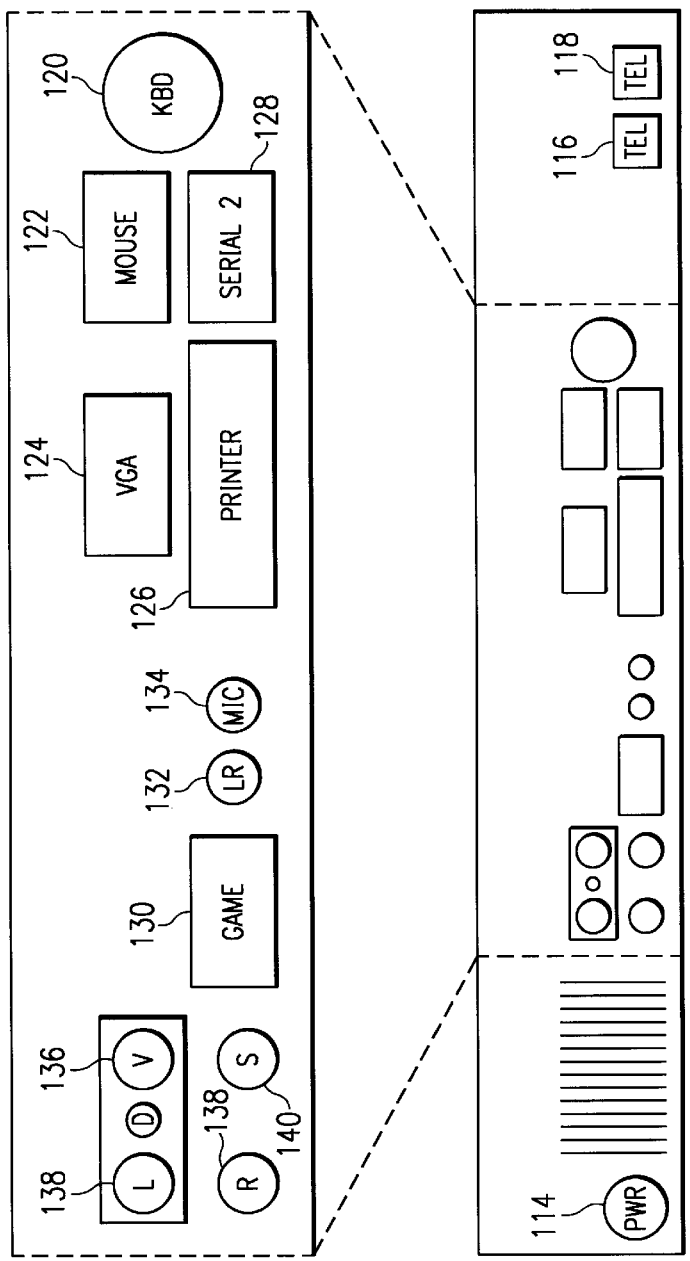
FIG. 2C is a pictorial representation of a rear panel of the data processing system unit.
Figure 2C:
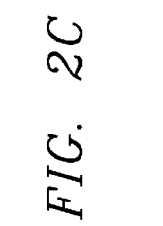

FIG. 2C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel ¾ modulator (not shown) may be connected in-line with the antenna connection.

Figure 2D:
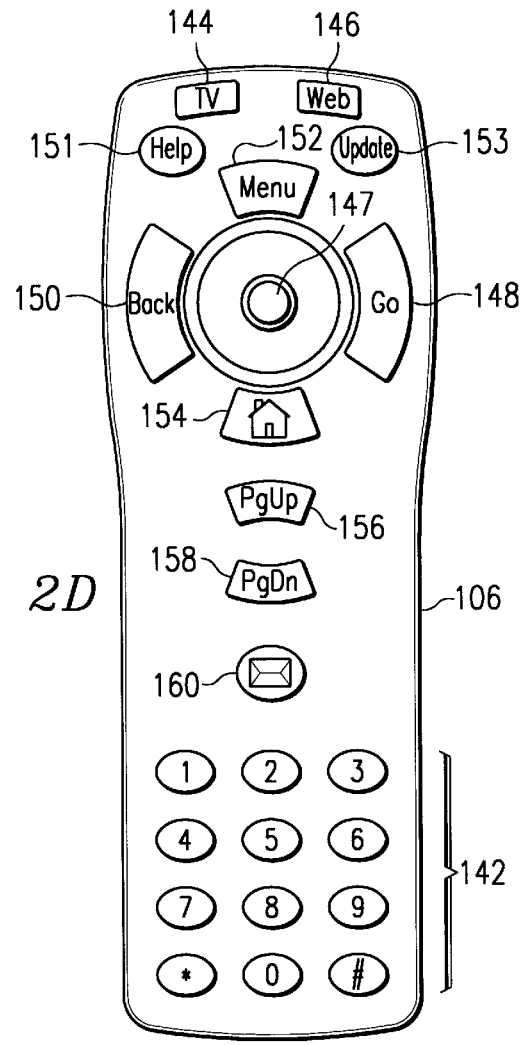
FIG. 2D is a pictorial representation of a remote control unit associated with the data processing system unit.

FIG. 2D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 3:
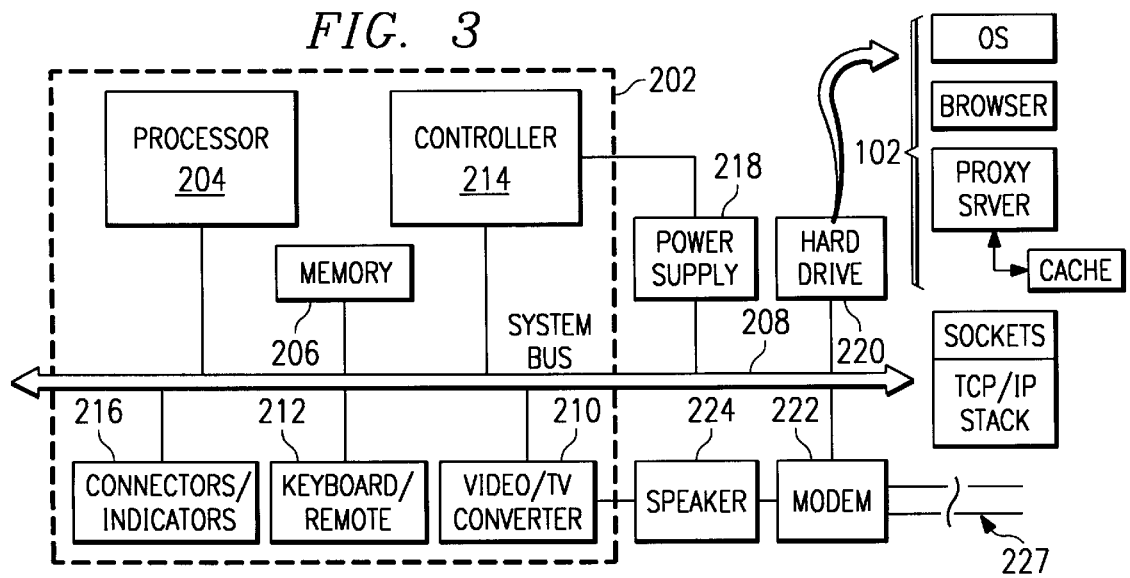
FIG. 3 is a block diagram of the major components of the data processing system unit.

Referring now to FIG. 3, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102. Such software preferably includes IBM DOS 7.0, a product of International Business Machines Corporation in Armonk, N.Y.; an operating system 221 such as Windows 3.1 (or higher), a product of Microsoft Corporation in Redmond, Wash.; and a browser 223 such as Netscape Navigator (Version 1.0 or higher), a product of Netscape Communications Corporation in Mountain View, Calif. The suite of Internet tools resident on the hard drive 220 also preferably include an FTP mechanism 225 to facilitate file transfers from Internet FTP sites, an SMTP mechanism 227 to provide electronic mail capability, an NNTP mechanism 229 to provide news group (i.e. bulletin board) service, and other known Internet protocol mechanisms. Of course, the software identified above is merely representative, as other known programs may be used in the alternative or by way of addition. Also, minor modifications of these software packages may be desirable to optimize performance of data processing unit 102.

Modem 222 may be any suitable modem used in conventional data processing systems, but is preferably a 33.6 kbps modem supporting the V0.42bis, V0.34, V0.17 Fax, MNP 1–5, and AT command sets. To maintain the slim height of data processing system 102, modem 222 is preferably inserted into a slot mounted sideways on motherboard 202. Modem 222 is connected to a physical communication link 227, which, in turn, in connected or connectable to the Internet and, in particular, a dialup network having a service provider.

Those skilled in the art will recognize that the components depicted in FIGS. 2A–2D and 3 and described above may be varied for specific applications or embodiments. Such variations in which the present invention may be implemented are considered to be within the spirit and scope of the present invention.

Figure 4:
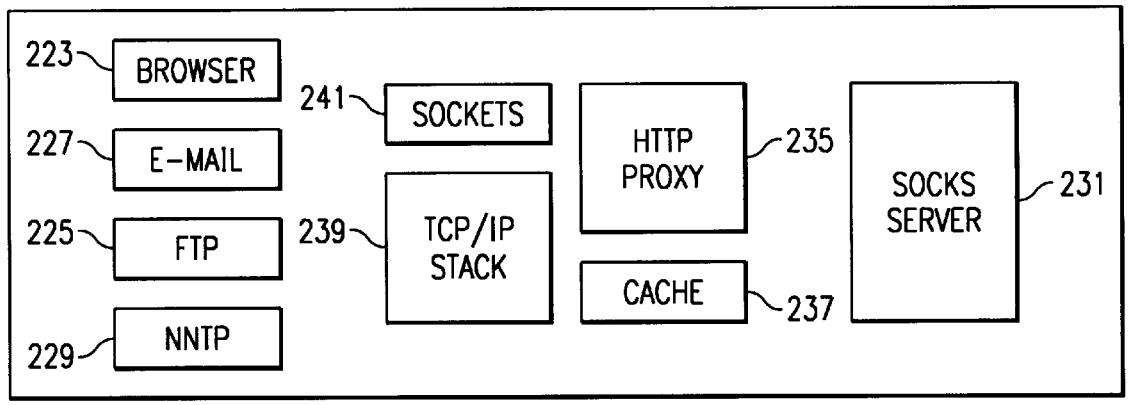
FIG. 4 is a block diagram of a client side proxy server and its associated cache implemented in the Web appliance of FIG. 2A.

According to the invention, and with reference to FIG. 4, the client machine preferably also includes an HTTP proxy server 235. Preferably, HTTP proxy server is implemented in software and includes a cache 237 associated therewith. The client machine may also include a SOCKS proxy server 231 for network monitoring, connection filtering and enhanced network security. The HTTP proxy server 235 intercepts HTTP GET requests and services them on behalf of the browser as described in copending application Ser. No. 08/808,287 which is assigned to the assignee of this application. This operation is effected without the browser being aware that the service is being handled locally. The SOCKS server 231 intercepts connection requests (irrespective of the protocol used) and provides local servicing of these requests if possible, and this server may also provide network activity monitoring and connection request filtering. The SOCKS server 231 is described in copending application Ser. No. 08/88,286 while is assigned to the assignee of the present invention. The client machine also includes a protocol stack 239 (e.g., a TCP/IP protocol stack) and a sockets mechanism 241, which are used to support communications in a known manner.

Preferably the proxy server starts up when the Web appliance is booted up. Connectivity between the proxy server and the browser is preferably achieved by configuring the browser to pass the HTTP requests to the proxy server. One mechanism for doing this is to have the browser open a socket and bind to the so-called "loopback" address. The loopback address is a well-known address, and is typically associated with Internet Protocol address 127.0.0.1. It is typically configured by setting the "http proxy" variable in the netscape.ini configuration file (in a Windows-based operating system environment) to "127.0.0.1" and the "http port" variable to "80".

The protocol stack 239, however, may not support the loopback address. In this circumstance, the present invention is used to enhance the sockets layer to redirect connection requests associated with stale IP addresses to a current or valid IP address. By way of brief background, a conventional sockets mechanism is first described below in the flowchart of FIG. 5.

Figure 5:
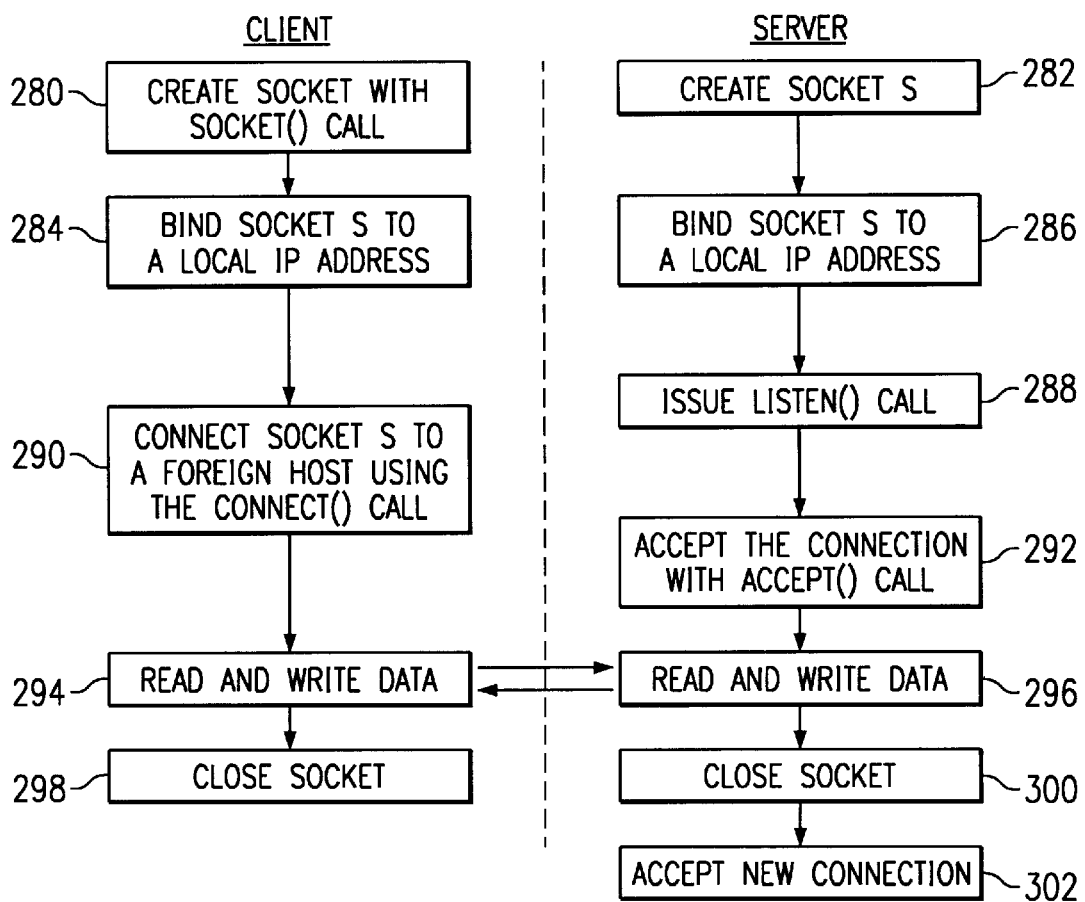
FIG. 5 is a flowchart of a conventional sockets mechanism between a client and a server.

FIG. 5 is a flowchart illustrating a known connection-oriented socket mechanism that is enhanced according to the teachings of the present invention. The various functions of the "client" are located on the left portion of the chart, and the functions of the "server" are located on the right portion. In the context of the present invention, the "client" is the browser and the "server" is the proxy server, both of which are supported on the client machine of FIG. 4. The following describes the mechanism used by the browser to obtain some Internet-based service, e.g., a Web page. At step 280, the client creates a socket "s" with a socket() call. The server also creates a socket "s" with the socket() call. These steps indicate that the client and server intend to open up a connection and thus certain data structures must be set up. At step 284 and at step 286, the client and server issue a bind call to bind the socket "s" to a local IP address. In the context of the present invention, the local address is used because the loopback address is assumed to be unavailable on the protocol stack 239. At step 288, the server issues a listen() call, indicating that it is willing to accept calls. At step 290, it is assumed that the client issues a connect() call that seeks to connect socket "s" to a "foreign" host, which as noted above is preferably the client side proxy server. The connect call specifies the destination address as the local IP address.

At step 292, the server accepts the connection and receives a second socket "ns" by issuing an accept() call. At this point the particular session is opened and the connection request may be carried out. For the server, socket s remains available to accept new connections and socket ns is dedicated to the client. At steps 294 and 296, the client reads and writes data on socket s and the server reads and writes data on socket ns, until all data has been exchanged. The read and write operations are carried out using send() and receive() calls. At step 298, the client closes socket s and ends the session with a soclose() call. The server closes socket ns with the soclose() call at step 300. The server may then accept another connection from a client or close the original socket s with the soclose() call at step 302.

In the typical Internet service environment, the Web appliance is connected to the Internet via a dialup computer network. The network and, in particular, the Internet service provider (or ISP) assigns an Internet Protocol (IP) address each time the Internet client dials up to the network. During a particular session, however, the connection to the dialup network may be broken, e.g., because the client is inactive for a period of time or if the physical connection is disrupted for any reason. In the dialup environment, the IP address assigned by the ISP can change every time a new modem connection is established. When this IP address changes, the browser has to reconfigure itself if the connection to the local proxy server supported in the client is to be maintained.

The present invention solves this problem by redirecting connection requests from stale IP addresses. This is accomplished by first generating a list of Internet Protocol (IP) addresses that are assigned, usually during a particular browsing session. FIG. 6 is a flowchart illustrating this process. The routine begins at step 302 when the browser session is initiated. At step 304, the routine initializes or otherwise creates a Last In, First Out (LIFO) stack. Initially, this stack is empty. A test 306 is made to determine whether there is a new modem connection, i.e. whether a new IP address has been assigned by the network service provider. As discussed above, a new IP address may be assigned each time a modem connection to the dialup computer network is established or re-established during a particular session. If the outcome of the test at step 306 is negative, the routine cycles back. If, however, the outcome of the test at step 306 is positive, a new IP address has been assigned. The routine then continues at step 308 and resolves the LOCALNAME to a latest IP address. At step 310, the routine continues and places the new IP address on the LIFO stack (as the Last In entry). At step 312, the routine reconfigures, with the latest IP address, any HTTP proxy server 235 and any SOCKS server 231. The routine then cycles back to before step 306.

It will be appreciated that as new IP addresses are assigned during a session, they are accumulated on the LIFO stack, which the current IP address (i.e. the IP address for the then-pending connection) being the Last In entry. All other IP addresses on the stack are then considered to be "stale" since they no longer represent true IP addresses.

A representative LIFO stack 305 is illustrated in FIG. 7. Of course, the LIFO stack structure is merely exemplary, as other data structures may be used in lieu of this stack. Stack 305 includes a Last In entry 307 and one or more entries 309 that were received in the stack 305 prior to the Last In entry 307.

The browser, however, is not "aware" of the changes to the IP addresses. It continues to formulate connection requests using the original IP address (e.g., LOCALNAME) that was assigned at the beginning of the browsing session (when the modem first connected to the Internet). Thus, the present invention provides an enhancement to the sockets mechanism of FIG. 5 to enable redirection of connection requests associated with stale IP addresses transparently to the browser and other Internet protocol mechanisms supported on the client. This operation is shown in the flowchart of FIG. 8.

In particular, the routine is run for each connect() request. This is step 290 in FIG. 5. A test is first made at step 320 to determine whether the connection request is associated with a stale IP address. If the outcome of the test at step 320 is positive, the routine branches to step 322 to overlay the stale IP address with the latest IP address. The latest IP address will be the Last in entry in the LIFO stack in the preferred embodiment, although as noted above other suitable data structures may be used in place of this stack. After step 322, or if the outcome of the test at step 320 is negative, the routine continues and services the request at step 324.

The inventive scheme provides significant advantages. It obviates restart of the Web appliance each time a new IP address is assigned by the dialup network, which may be quite often as modem connections are interrupted or re-established. By maintaining a transparent connection between the browser and the proxy server, the proxy server may be used to provide enhanced client side services. Depending on the type of proxy server implemented, these services include, without limitation, improved caching, Web content filtering, Web content access control, network activity monitoring, and processing of Web data to alter the "look and feel" of the user interface.

One of the preferred implementations of the sockets redirecting mechanism of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the artwould also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by letters patent is set forth in the following claims.

What is claimed is:

1. A method of managing connection requests from an application supported on a client, the client having a modem connectable to at least one server via a dialup computer network, the method comprising the steps of:

maintaining a list of local Internet Protocol (IP) addresses assigned as modem connections are established to the dialup computer network during a session, the list including a latest IP address and one or more stale IP addresses;

in response to a connection request associated with a stale IP address, mapping the stale IP address to a latest IP address; and redirecting the connection request using the latest IP address.

2. The method as described in claim 1 wherein the latest IP address is an IP address assigned by the server as a current modem connection was established to the dialup computer network during the session.

3. The method as described in claim 1 wherein the list is a Last In, First Out (LIFO) stack and the latest IP address is the Last In entry.

4. The method as described in claim 1 wherein the application is a browser.

5. The method as described in claim 1 wherein the client is Web appliance.

6. The method as described in claim 1 wherein the local IP addresses are assigned by the dialup computer network.

7. The method as described in claim 1 wherein the connection request is serviced using a proxy server supported on the client.

8. A method of managing connection requests from an browser supported on an Internet client, the Internet client having a modem connectable to at least one Internet server via a dialup computer network, the method comprising the steps of:

maintaining a list of local Internet Protocol (IP) addresses assigned as modem connections are established to the dialup computer network during a browsing session, the list including a latest IP address and one or more stale IP addresses;

determining whether an IP address associated with a connection request is a stale IP address;

if the IP address associated with the connection request is a stale IP address, mapping the IP address associated with the connection request to a latest IP address; and redirecting the connection request using the latest IP address.

9. The method as described in claim 8 wherein the latest IP address is an IP address assigned by the server as a current modem connection was established to the dialup computer network during the session.

10. The method as described in claim 8 wherein the list is a Last In, First Out (LIFO) stack and the latest IP address is the Last In entry.

11. The method as described in claim 8 wherein the Internet client is a Web appliance.

12. The method as described in claim 8 wherein the connection request is serviced using a proxy server supported on the client.

13. A computer program product in a computer-readable medium for use in managing HTTP connection requests from an browser supported on an Internet client, the Internet client having a modem connectable to at least one Internet server via a dialup computer network, the computer program product comprising:

means for maintaining a list of local Internet Protocol (IP) addresses assigned as modem connections are established to the dialup computer network during a session, the list including a latest IP address and one or more stale IP addresses;

means responsive to a connection request associated with a stale IP address for mapping the stale IP address to a latest IP address; and means for redirecting the connection request using the latest IP address.

14. The computer program product as described in claim 13 wherein the list is a Last In, First Out (LIFO) stack and the latest IP address is the Last In entry.

15. A computer program product in a computer-readable medium for use in managing HTTP connection requests from an browser supported on an Internet client, the Internet client having a modem connectable to at least one Internet server via a dialup computer network, the computer program product comprising:

means for maintaining a list of local Internet Protocol (IP) addresses assigned as modem connections are established to the dialup computer network during a session, the list including a latest IP address and one or more stale IP addresses;

means for determining whether an IP address associated with an HTTP connection request is a stale IP address;

means responsive to the determining means for mapping the IP address associated with the HTTP connection request to a latest IP address; and means for redirecting the HTTP connection request using the latest IP address.

16. A client computer connectable to the Internet via a dialup computer network, comprising:

a modem;

a processor having an operating system;

a browser application run by the operating system;

a sockets routine run by the operating system for managing connection requests from the browser application, the sockets routine comprising:

means for maintaining a list of local Internet Protocol (IP) addresses assigned as modem connections are established to the dialup computer network during a session, the list including a latest IP address and one or more stale IP addresses;

means responsive to a connection request associated with a stale IP address for mapping the stale IP address to a latest IP address; and means for redirecting the connection request using the latest IP address.

17. The client computer as described in claim 16 further including a proxy server.

18. The client computer as described in claim 16 wherein the list is a Last In, First Out (LIFO) stack and each entry in the stack is created upon modem connection to the dialup network during the session.

19. A data processing system, comprising:

a remote control unit; and a base unit connectable to a monitor for providing Internet access under the control of the remote control unit, the base unit comprising:

a modem;

a processor having an operating system;

a browser application run by the operating system;

a sockets routine run by the operating system for managing connection requests from the browser application, the sockets routine comprising:

means for maintaining a list of local Internet Protocol (IP) addresses assigned as modem connections are established to the dialup computer network during a session, the list including a latest IP address and one or more stale IP addresses;

means responsive to a connection request associated with a stale IP address for mapping the stale IP address to a latest IP address; and means for redirecting the connection request using the latest IP address.

20. The data processing system as described in claim 19 wherein the base unit further includes a proxy server run by the operating system.

21. The data processing system as described in claim 19 wherein the list is a Last In, First Out (LIFO) stack and each entry in the stack is created upon modem connection to the dialup network during the session.

22. The data processing system as described in claim 19 wherein the monitor is a television.

* * * * *